United States Patent [19]

Stevens

[11] 4,290,612
[45] Sep. 22, 1981

[54] SURFACE CONFORMING THERMAL/PRESSURE SEAL

[76] Inventor: Robert A. Frosch, Administrator of the National Aeronautics and Space Administration, with respect to an invention of Martin L. Stevens, Setauket, N.Y.

[21] Appl. No.: 102,593

[22] Filed: Dec. 12, 1979

[51] Int. Cl.³ .............................................. B32B 9/04
[52] U.S. Cl. .................................. 277/81 R; 277/189; 244/113; 244/217; 244/163; 418/113; 418/142
[58] Field of Search ...................... 244/113, 217, 163; 277/81 P, 189, 81 R; 418/113, 142

[56] References Cited

U.S. PATENT DOCUMENTS

| | | | |
|---|---|---|---|
| 2,241,335 | 5/1941 | Wedberg | 244/217 |
| 2,279,615 | 4/1942 | Bugatti | 244/217 |
| 2,678,785 | 5/1954 | Graham | 244/113 |
| 3,988,081 | 10/1976 | Goloff | 277/81 P |
| 4,151,800 | 5/1979 | Dotts et al. | 244/163 |
| 4,156,586 | 5/1979 | Morris | 277/81 P |

*Primary Examiner*—Robert I. Smith
*Attorney, Agent, or Firm*—Marvin J. Marnock; John R. Manning; Marvin F. Matthews

[57] ABSTRACT

A seal assembly for sealing a variable gap between the surface of a first element and a second element movable relative thereto. A seal may comprise a seal housing attached to the second element for movement therewith and having a sealing surface thereon and at least one elongated seal member carried by the housing having first and second conjugate sealing surfaces thereon, the first sealing surface for rubbing and sealing engagement with the first element surface and the second sealing surface for sliding and sealing engagement with the housing sealing surface. A biasing assembly may be carried by the housing for biasing the first and second conjugate sealing surfaces of the sealing member toward sealing engagement with the first element surface and housing sealing surface, respectively.

18 Claims, 12 Drawing Figures

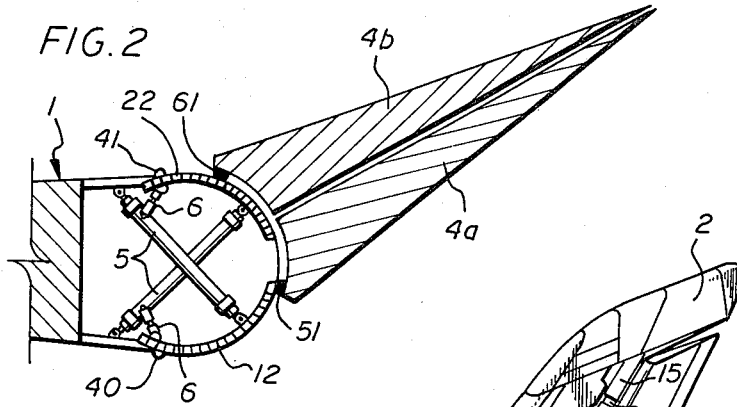
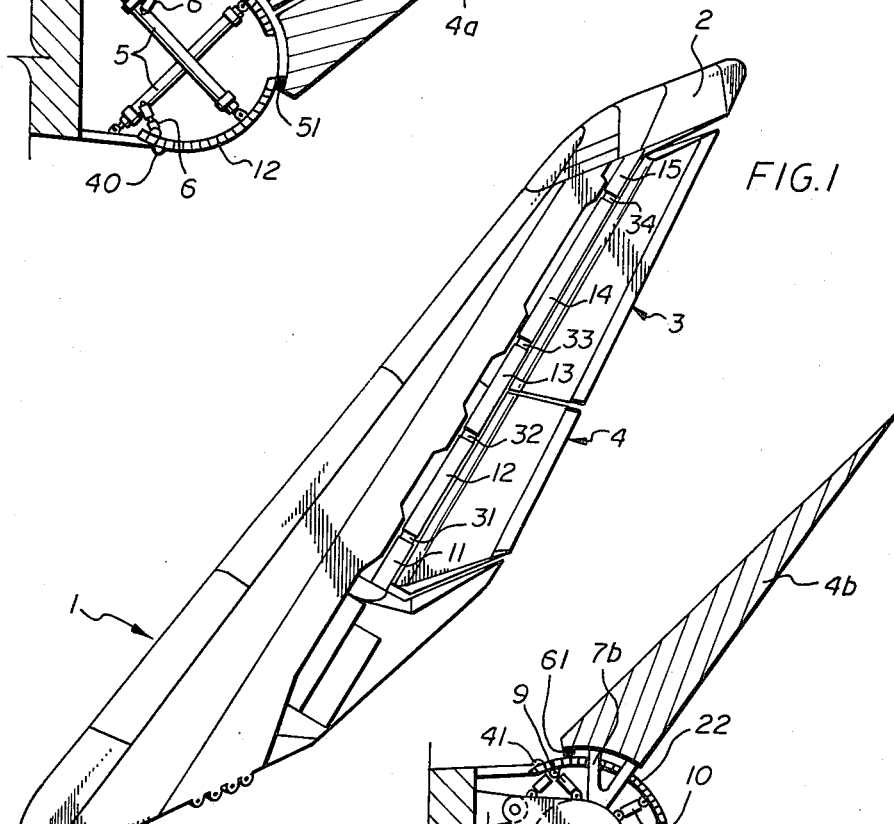
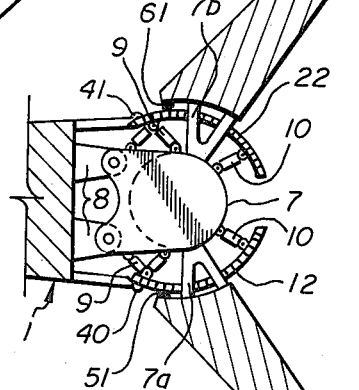

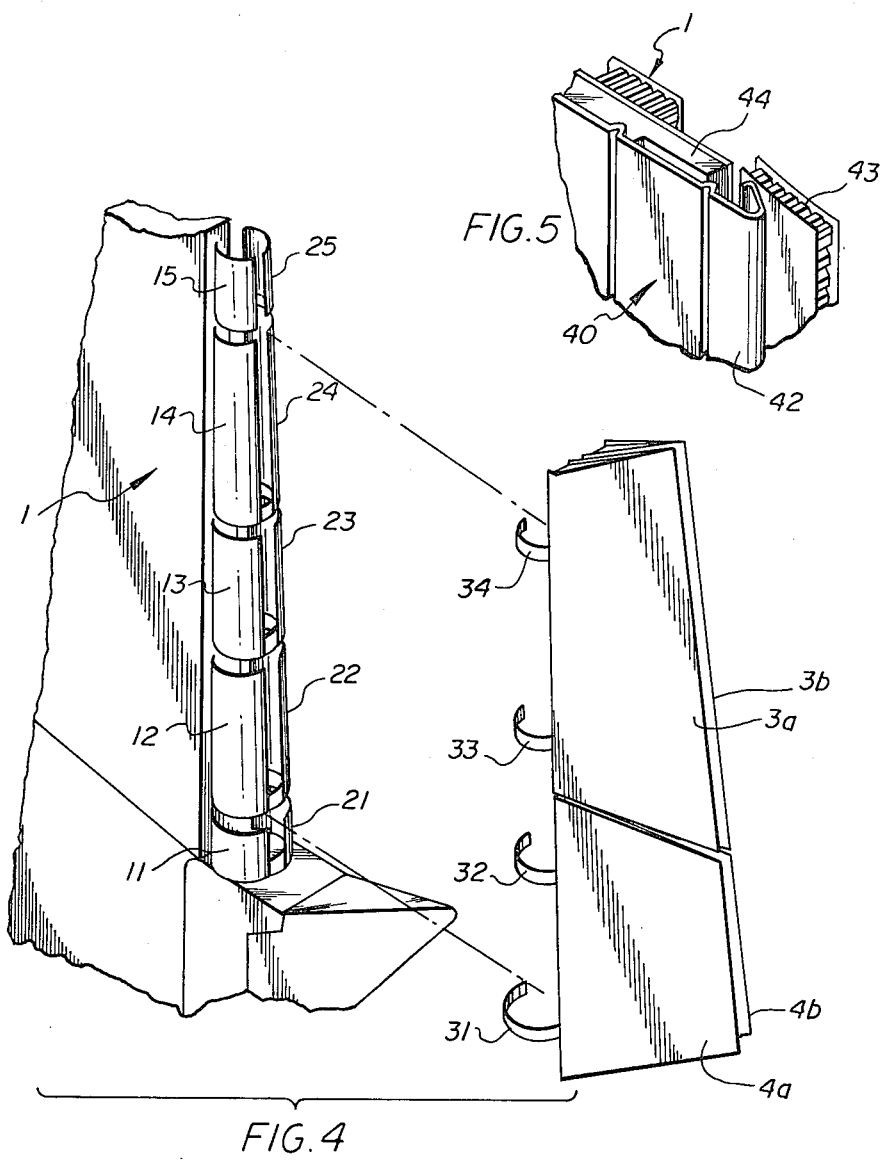

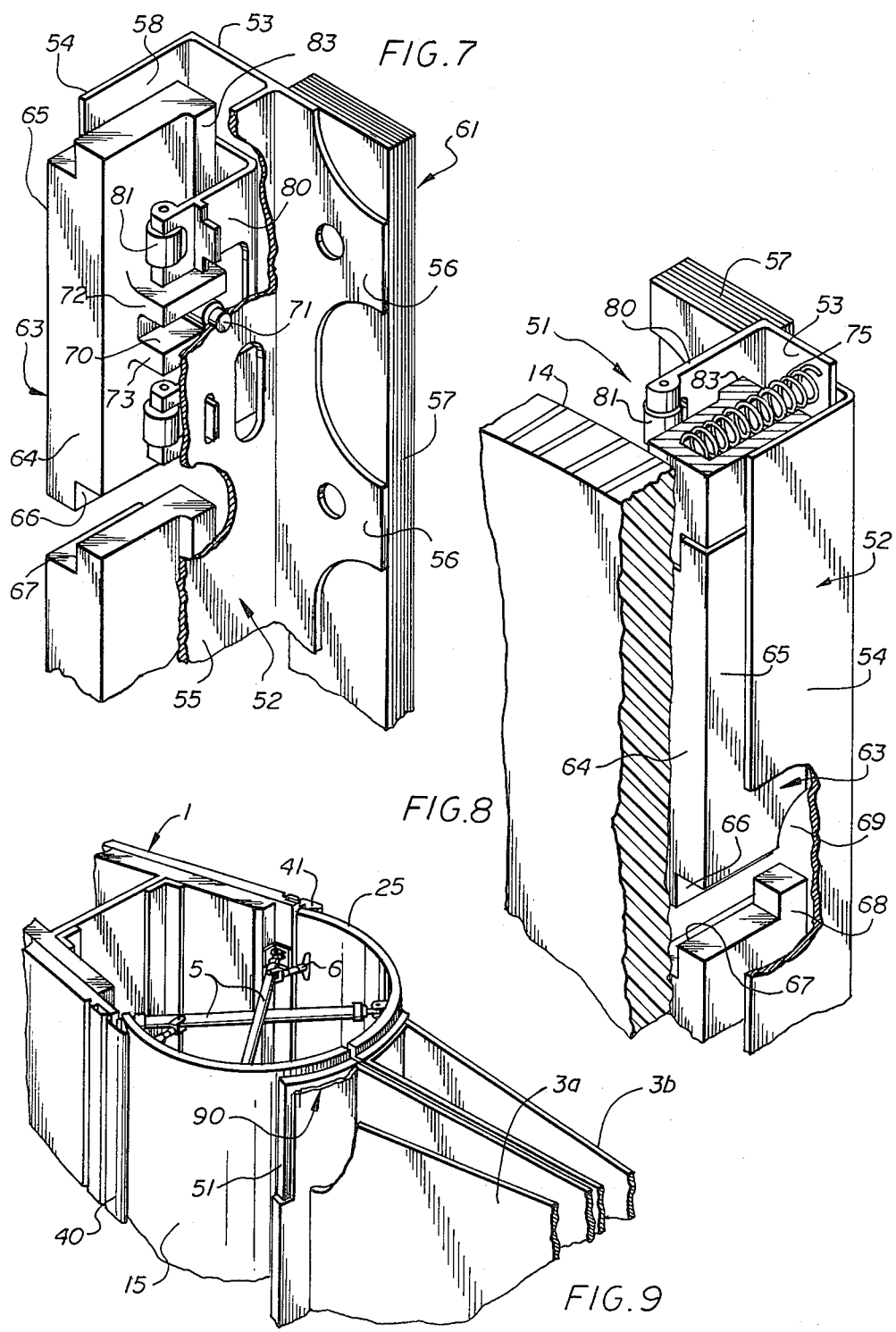

SURFACE CONFORMING THERMAL/PRESSURE SEAL

ORIGIN OF THE INVENTION

The invention described was made in the performance of work under a NASA contract and is subject to the provisions of Section 305 of the National Aeronautics and Space Act of 1958, Public Law 85-68 (72 STAT. 435; USC 2457).

BACKGROUND OF THE INVENTION

1. Field of the Invention

The present invention pertains to thermal/pressure seals. Specifically, it pertains to nonabrasive, low friction seals for preventing or restricting fluid flow through gaps between the surfaces of first and second elements which may be movable relative to each other and which may be subjected to distortion caused by large variations in temperature and/or pressure. In particular, the sealing apparatus of the present invention pertains to a surface conforming thermal/pressure seal suitable for use with space vehicles.

2. Brief Description of the Prior Art

High speed aircraft, particularly missiles and space vehicles, are subjected to extreme temperatures, 1000° C. not being uncommon. This is particularly true upon reentry of such missiles and spacecraft into the earth's atmosphere. To prevent harmful aerodynamic effects, it is desirable to provide proper pressure and thermal sealing at junctions between various components of such missiles or space vehicles. Various forms of primarily thermally sealing apparatus may be seen in U.S. Pat. Nos. 3,114,319; 3,596,604; and 3,776,139.

While the thermal barriers of the prior art are suitable for protecting the body or other fixed components of spacecraft, they do not generally provide the flexibility necessary for providing thermal and pressure seals between movable members, such as found in the various control devices utilized in spacecraft. To perform this function, some form of dynamic sealing must be provided. Prior methods of dynamic sealing which utilize seals of flexible, flat or tubular configuration may be suitable where there is limited movement between adjoining components. However, prior methods of dynamic sealing have proven incapable of providing the magnitude of flexibility and non-abrasive low frictional characteristics required to seal between large relatively movable elements.

SUMMARY OF THE INVENTION

In the present invention, sealing apparatus is provided which serves both pressure and thermal sealing functions between adjacent and relatively movable elements of relatively large surfaces. Not only is the sealing apparatus of the present invention of the flexibility required for large movable surfaces, it has the ability to accommodate moderate variations in the gap between such surfaces which may be effected by thermal distortion or the like. In addition, sealing is accomplished with a non-abrasive, low frictional material, creating as little resistance as possible to movement of control members and minimal wear and damage to surface coatings.

The sealing apparatus of the present invention may comprise: a seal housing for attachment to one of two adjacent and relatively movable elements and a sealing member carried by the housing having first and second conjugate sealing surfaces thereon, the first sealing surface being for rubbing and sealing engagement with the surface of one of the relatively movable elements and the second sealing surface being for sliding and sealing engagement with a sealing surface on the housing. A biasing assembly may be also carried by the housing for biasing the first and second conjugate sealing surfaces toward sealing engagement with the first element surface and the housing sealing surface respectively.

The sealing member may comprise a plurality of sealing segments disposed end to end so that the first and second conjugate sealing surfaces may be of substantially continuous and elongated disposition. The sealing segments may be elongated blocks of relatively rigid low-friction, non-abrasive material such as graphite.

The resulting seal of the present invention therefore provides a seal which performs both thermal and pressure sealing between movable elements having relatively large surfaces and the gap between which may vary due to the extreme pressure and thermal conditions encountered in space flight. While the seal of the present invention was designed primarily for use on space vehicles, it could be utilized in any application where a non-abrasive, low frictional sealing element must function to prevent or restrict fluid flow while traversing large areas subjected to temperature and/or pressure distortion. Other advantages and objects of the invention will be apparent from reading the specification which follows in conjunction with the accompanying drawings.

BRIEF DESCRIPTION OF THE DRAWINGS

FIG. 1 is a pictorial illustration of a tail assembly of a spacecraft with which the seal assembly of the present invention may be utilized;

FIG. 2 is a diagrammatic top view representation of a portion of the tail assembly of FIG. 1, illustrating rudder/speed brake portions thereof in a rudder position and showing disposition of seal assemblies according to the present invention;

FIG. 3 is a diagrammatic representation similar to FIG. 2 but showing the rudder/speed brake in the speed brake position;

FIG. 4 is a perspective view of the tail assembly of FIG. 1, portions of which have been broken away and the rudder/speed brakes of which are shown removed from the assembly to more fully illustrate various components thereof;

FIG. 5 is an enlarged detail illustrating a longitudinal seal utilized in the assembly of FIG. 4;

FIG. 6 is an enlarged detail generally illustrating a seal assembly according to the present invention and its disposition in the assembly of FIG. 4;

FIGS. 7 and 8 are enlarged perspective views of portions of sealing assemblies, according to a preferred embodiment of the invention, FIG. 7 representing the seal assembly for a righthand rudder and FIG. 8 representing a seal assembly for a lefthand rudder;

FIG. 9 is a perspective view of a top portion of the tail assembly of FIG. 1, the fin tip of which has been broken away to show an alternate embodiment of the seal assembly of the present invention for use at a curved surface;

FIG. 10 is a partially sectioned elevation detail of an alternate embodiment seal assembly illustrated in FIG. 9;

DESCRIPTION OF THE PREFERRED EMBODIMENTS

Figure 11:
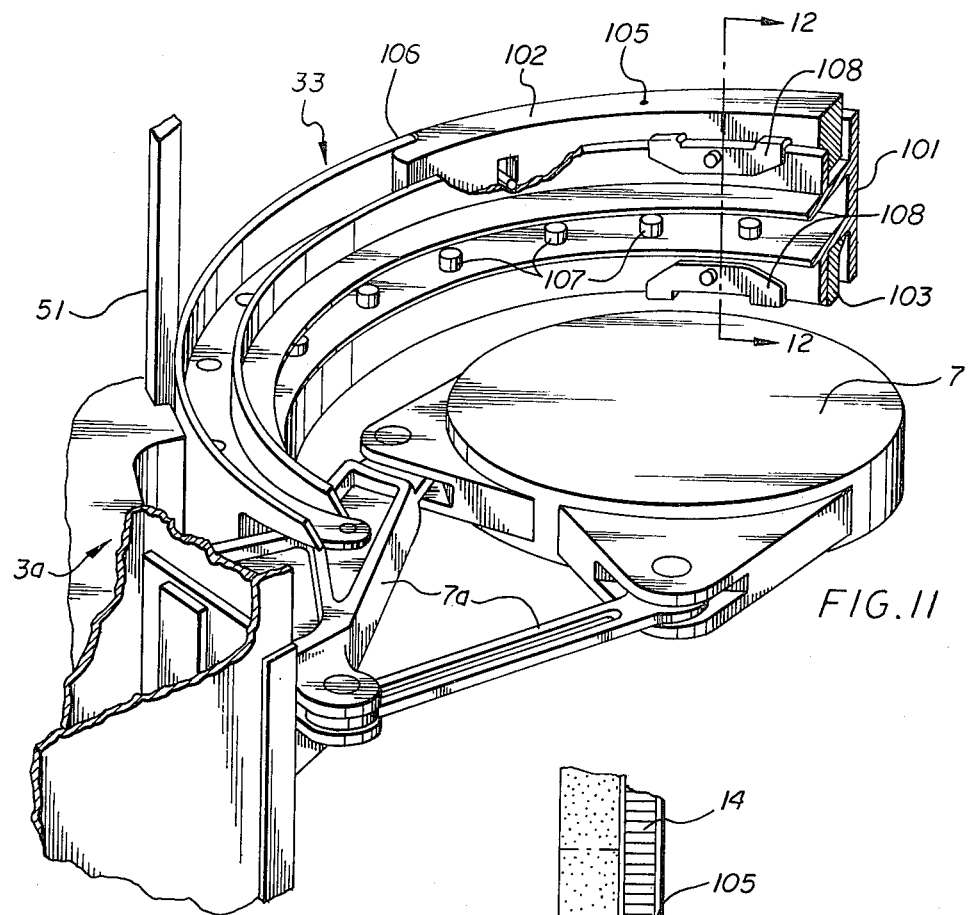
FIG. 11 is a partial perspective view of another portion of the tail assembly of FIG. 1 illustrating still another embodiment of the seal assembly of the present invention for utilization at a curved surface.

Although the seal assembly of the present invention can be utilized in many applications, it will be described herein with reference to its use in the tail assembly of a spacecraft such as the orbiter. Such a tail assembly, as generally represented in FIG. 1, may include a fin portion 1, fin tip 2, upper rudder/speed brakes 3 and lower rudder/speed brakes 4. As will be seen hereafter, the upper and lower rudder/speed brakes 3 and 4 are provided with both right and lefthand panels, the operation of which will be more fully understood hereafter. For description purposes, the lefthand panels will be referred to as 3a and 4a and the righthand panels as 3b and 4b. When both the right and left hand panels move concurrently as illustrated in FIG. 2, these control surfaces act as a rudder. When the right and lefthand panels are fully separated, as illustrated in FIG. 3, these control surfaces act as a speed brake. They can also be partially separated (not shown) to act as both a rudder and speed brake. The rudder panels 3 and 4 rotate about the center of a number of conical seal panels 11, 12, 14, 15 and 21, 22, 23, 24, and 25 (see also FIG. 4) which are affixed to the fin portion 1 of the tail assembly by a number of struts 5 and links 6 at strategic locations within the tail assembly.

Various actuator devices 7 are mounted between the conical panels, as illustrated in FIG. 3, for movement of the rudder/speed brake panels, e.g. 4a and 4b in response to power devices provided in the tail assembly (not shown). The actuator 7 may be attached to the fin section by mounting lugs 8 and to the conical panel sections by links 9 and 10. The panel members may be attached to the actuator 7 by moving actuator arms 7a and 7b. Since the arms 7a and 7b which support the rudder panels extend from the rotating actuators 7 beyond the outside surface of the cone defined by the conical panels, the panels are sectioned and the space between them concealed with sectors, only the left ones 31, 32, 33 and 34 of which are shown in FIGS. 1 and 4, it being understood that righthand ones are provided for the righthand rudder panels.

The conical panels and other components of the tail assembly are subjected to extreme pressures and temperatures and extreme pressure and temperature variations and differentials. While this results in structural deflection and distortion of the conical panel contours, the link and strut arrangements illustrated in FIGS. 2 and 3 minimize such distortion and deviation of the conical panel surfaces from their basic contour.

Several areas of the tail assembly require sealing. One such area is the junction between the fin portion of the tail and the conical panels. To provide sealing at this point, longitudinal seals 40 and 41 are provided on opposite sides of the tail assembly. FIG. 5 illustrates such a seal which may comprise a metallic seal carrier 42 to which is attached a longitudinal flat seal member 43 of a suitable flexible material. A strip of insulating material 44 may be provided and the entire seal assembly 40 attached to forward protions of the fin 1 in any suitable manner. This particular seal could be designed in several ways but since it forms no part of the present invention, will be discussed no further.

Thermal/pressure seals are required in three other areas, the leading edge of the upper and lower rudder speed brakes 3 and 4, the top and bottom of the upper and lower rudder/speed brake panels 3a, 3b, 4a, and 4b, and both edges of the rotating sectors, e.g. 31, 32, 33, and 34. Although the sealing assemblies of the last two mentioned locations must seal with curved surfaces, all three locations may utilize a seal assembly of the present invention with slight modification.

The seal assembly for the leading edge of the rudder panel will be described first, the seal assembly for the other two areas being described hereafter. As stated, this seal assembly is for the leading edge of the rudder panels and is generally disposed as shown in FIGS. 2 and 3, 51 representing the seal assembly for the lefthand panels and 61 representing the seal assembly for the righthand panels. In the detail of FIG. 6, the lefthand seal assembly 51 is generally represented attached to the leading edge of the upper lefthand rudder panel 3a for sealing the gap between the surface of a conical seal panel 14 and rudder panel 3a. In general, the seal assembly 51 includes a housing 52 attached to the rudder panel 3a for movement therewith, a sealing element 63 carried by the housing 52 and biasing means including a spring lever system 80 for biasing the sealing surfaces of the sealing element 63 into sealing engagement with the surface of conical panel 14 and a sealing surface located on the housing 52.

Referring now to FIGS. 7 and 8, the seal assemblies 51 (lefthand panel) and 61 (righthand panel) will be described in more detail. The components for the righthand and lefthand assemblies are the same, being merely mirror images of each other. For this reason, the same reference numbers will refer to components of either seal assembly. The housing 52 may be formed of channel-like metal having a base portion 53 and side portions 54 and 55 extending perpendicularly therefrom. The base portion 53 of the housing projects from the side portion 55 to provide tabs 56 by which the seal assembly may be attached to the leading edge of a respective rudder panel in the disposition illustrated in FIG. 6. Since the rudder structure may be aluminum, it is necessary that the conduction of high heat be reduced. Therefore, an isolation block or strip 57 may be provided of a suitable insulating material. The housing 52 should be provided with a sealing surface and this is accomplished by the inside surface 58 of the side extension 54.

The sealing element 63 of the sealing assembly may be provided by a plurality of elongated segments or blocks. In addition to being capable of withstanding high temperatures, these sealing blocks must also be nonabrasive and provide low frictional resistance. The nonabrasive characteristic is necessary because the heat-reflective paint applied to the conical panels, e.g. 14, is vulnerable to scratching. The low friction characteristic is required to permit the sealing elements to articulate freely under atmospheric pressure and mechanical loads. Graphite seems to be the only material providing all of the characteristics required for suitable operation on a heat reflective painted surface. Since graphite is a rigid material and since a continuous length of this sealing element would not seal properly on distorted surfaces, it is necessary that these blocks 63 be provided in segments in order to conform to moderate variations in the contour of the various sealing surfaces.

The graphite seal blocks 63 are provided with first and second conjugate sealing surfaces 64 and 65, respectively. The first sealing surface 64 is for rubbing and sealing engagement with the surface of the conical panels, e.g. 14; while the second sealing surface 65 is for sliding and sealing engagement with the housing sealing surface 58. The conjugate sealing surfaces 64 and 65 are mutually perpendicular.

Since adjoining surfaces of the seal block 63 must be properly sealed while the segmented blocks articulate to accommodate distortion of contour and deflection of the supporting structure, adjacent ones of the blocks 63 are provided with mutually overlapping and sealingly engageable surfaces 66 and 67. These surfaces maintain the seal at the housing sealing surface 58 while allowing limited articulation of adjacent ones of the seal blocks 63 about axes substantially perpendicular to the housing sealing surface 58 so that a substantially continuous and elongated sealing surface is provided at the rubbing surfaces 64 substantially conforming to the surface of conical panels 14 upon limited non-uniform variations thereof due to pressure and temperature differentials. An interlocking flexible joint may also be assured by mating lug 68 and recess 69 portions of the seal blocks.

Since a significant thermal differential may occur between the graphite seal blocks 63 and the metallic housing 52, a mutually engageable guide slot 70 and pin 71 may be provided. The locating pin 71 is attached to the side extension 55 of the housing and the guide slot 70 may be provided between projections 72 and 73 of the graphite blocks 63. This allows relative thermal expansion and contraction of the housing without interrupting the sealing engagement of the first and second conjugate sealing surfaces with conical panel 14 and housing sealing surface 58.

To assure that the respective sealing surfaces remain in sealing contact, biasing means must be provided. Such biasing means may include a first biasing assembly for biasing the first conjugate sealing surface 64 of the blocks 63 toward the conical panel 14 and may include a plurality of helically wound springs 75 disposed, in recesses provided therefor in the block 63, between the block and the base portion 53 of the housing 52.

The second biasing assembly is a spring lever system which biases the elongated block 63 and its second conjugate sealing surface 65 toward the housing sealing surface 58. The spring lever system comprises one or more cantilevered springs 80, the free ends of which are disposed against the side of the elongated blocks 63 opposite the second conjugate sealing surfaces 65. The free ends of the cantilevered springs 80 may be provided with roller members 81 for engagement with the blocks 63 and by which the force of the cantilevered springs 80 is transposed to the elongated block 63. This side of the elongated block 63 may terminate along one edge thereof in an elongated lip portion 83 engageable with the roller member 81 to prevent displacement of the block 63 from the housing 52.

Since the housing 52 may deflect toward and away from the conical panel 14 a significant amount, low rate springs are desired to minimize the variation in spring force. The spring forces must be low enough to minimize frictional forces yet high enough to hold the seal blocks 63 is proper sealing engagement. Furthermore, the spring force acting in conjunction with a proper lever ratio is required to maintain a balance between the force at the rubbing surface 64, the force at the sliding surface 65 and the frictional force between adjacent and overlapping seal block surfaces 66 and 67.

It will be noted that in the embodiments of FIGS. 7 and 8, the first and second conjugate sealing surfaces 64 and 65 are planar. In other embodiments, one of these surfaces may be a curved surface. For example, with reference to FIGS. 9 and 10, such an embodiment is shown for sealing at the top of conical panels 15 and 25 and upper rudder panels 3a and 3b. This seal assembly embodiment, designated 90, is similar to the previously described embodiment, having a similar housing 91, graphite seal blocks 92 and biasing assemblies (not shown). Like in the previously described embodiment the seal block 92 is provided with first and second conjugate sealing surfaces 93 and 94 respectively, the surface 93 for sealing against the conical panels 15 and 25 and the surface 94 for sealing against sealing surface 95 of housing 91. Like in the previous embodiment, the sealing surface 94 is planar. However, since the seal is on the circumference of panel members 15 and 25, the first conjugate sealing surface 93 is curved to conform therewith.

Figure 12:
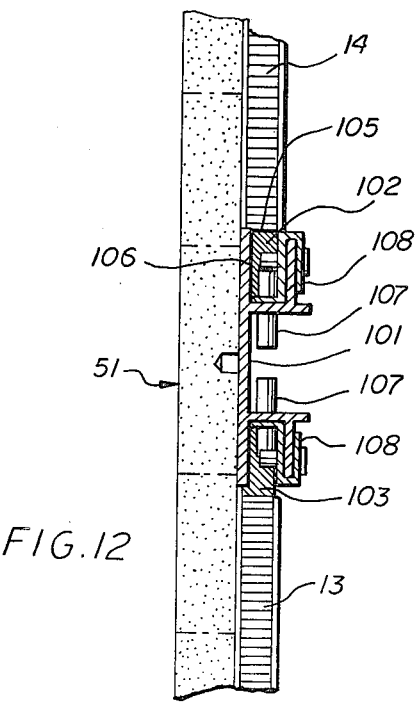
FIG. 12 is a sectioned elevation view taken along line 12—12 of FIG. 11 further illustrating the seal assembly thereof.

Referring now to FIGS. 11 and 12, another embodiment having a curved sealing surface is shown. This is the embodiment used with the rotating seal sectors 31, 32, 33, 34, etc. previously described with reference to FIG. 4. In FIG. 11, one of the rotating sector seal assemblies 33 is shown in relative disposition with the upper lefthand rudder panel 3a, its respective leading edge seal assembly 51 and actuator 7 to which the rudder panel 4a is attached by actuator arm 7a for rotation thereof. The sector seal assembly 33, like the previously described embodiments, includes a housing 101 which is affixed for rotation with the rudder panel 3a. However, since a seal must be provided at the bottom of one panel 14 and the top of another panel 13, the housing must accommodate upper graphite seal blocks 102 and lower graphite seal blocks 103.

Biasing assemblies are provided for biasing the first and second conjugate sealing surfaces 105 and 106, respectively, into sealing engagement with the surface of the panel edges and the sealing surface on the housing respectively. The first biasing assembly may, like in other embodiments, comprise helically wound encapsulated springs 107. However, separate springs 108 may be used in lieu of the lever springs of previous embodiments to provide a side load to the seal blocks 102 and 103. This is necessary because space limitations and encapsulation of the springs 107 may preclude the use of a lever. However, the resolution of forces at this location permit the use of such a two-spring biasing system.

In this embodiment, the first conjugate sealing surface 105 of the seal blocks 102 and 103 is planar, the second conjugate sealing surfaces 106 being curved to conform with the sealing surface on the housing 101 against which the sealing blocks are to seal. Thus, the unique sealing assembly of the present invention can be adapted for application with various sealing surfaces with which it is to conform.

The resulting seal is one having high heat resistant and non-abrasive low friction characteristics. It is capable of traversing large areas subjected to distortion caused by large variations in temperature and/or pressure. It is a dynamic seal far superior to other seals in certain temperature, pressure and material environments in which it is intended to be used.

While at least three embodiments of the invention have been described herein, many variations thereof can be made without departing from the spirit of the invention. Accordingly, it is intended that the scope of the invention be limited only by the claims which follow.

What is claimed is:

1. A seal assembly for sealing a variable gap between the surface of a first element and a second element movable relative thereto comprising:

seal housing means attached to said second element for movement therewith and having a sealing surface thereon;

sealing means carried by said housing means having first and second conjugate sealing surfaces thereon, said first sealing surface for rubbing and sealing engagement with said first element surface, said second sealing surface for sliding and sealing engagement with said housing sealing surface; and biasing means carried by said housing means for biasing said first and second conjugate sealing surfaces of said sealing means toward said sealing engagement with said first element surface and said housing sealing surface, respectively.

2. A seal assembly as set forth in claim 1 in which said sealing means comprises a plurality of sealing segments disposed end to end to provide said first sealing surface in a substantially continuous and elongated disposition.

3. A seal assembly as set forth in claim 2 in which each of said sealing segments is carried by said housing means for limited articulation, relative to adjacent ones of said sealing segments, about axes substantially perpendicular to said housing sealing surface so that said substantially continuous and elongated first sealing surface may substantially conform to said first element surface upon limited non-uniform variations thereof.

4. A seal assembly as set forth in claim 3 in which adjacent ones of said sealing segments are provided with mutually overlapping said sealingly engageable surfaces for maintaining the seal at said second sealing surface during said limited articulation of said sealing segments.

5. A seal assembly as set forth in claim 2 in which said housing means and each of said sealing segments include mutually engageable guide means allowing relative thermal expansion and contraction of said housing means and said sealing segments without interrupting said sealing engagement of said first and second conjugate sealing surfaces with said first element surface and said housing sealing surface.

6. A seal assembly as set forth in claim 1 in which said sealing means comprises at least one elongated block of a relatively rigid material on which is provided said first and second conjugate sealing surfaces, said first and second conjugate sealing surfaces being mutually perpendicular.

7. A seal assembly as set forth in claim 6 in which said elongated block is of a low friction nonabrasive graphitic material.

8. A seal assembly as set forth in claim 6 in which said housing sealing surface is substantially parallel with said second conjugate sealing surface.

9. A seal assembly a set forth in claim 6 in which said biasing means includes a first biasing assembly biasing said elongated block and said first conjugate sealing surface toward said first element surface and a second biasing assembly biasing said elongated block and said second conjugate sealing surface toward said housing sealing surface.

10. A seal assembly as set forth in claim 9 in which said first biasing assembly comprises at least one helically wound spring disposed between said elongated block and a portion of said housing means.

11. A seal assembly as set forth in claim 9 in which said second biasing assembly comprises at least one cantilevered spring, the free end of which is disposed against a side of said elongated block opposite said second conjugate sealing surface.

12. A seal assembly as set forth in claim 11 in which said free end of said cantilevered spring is provided with a roller member engaging said opposite side of said elongated block and by which the force of said cantilevered spring is transposed to said elongated block.

13. A seal assembly as set forth in claim 12 in which said opposite side of said elongated block terminates along one edge thereof at an elongated lip portion engageable with said roller member to prevent displacement of said elongated block from said housing means.

14. A seal assembly as set forth in claim 6 in which both of said first and second conjugate sealing surfaces are planar.

15. A seal assembly as set forth in claim 6 in which one of said first and second conjugate sealing surfaces is a curved surface.

16. A seal assembly as set forth in claim 6 in which said first sealing surface is curved to substantially conform with the curvature of said first element surface.

17. A seal assembly as set forth in claim 6 in which said housing sealing surface is curved, said second sealing surface being curved to substantially conform with the curvature of said housing sealing surface.

18. A seal assembly as set forth in claim 1 in which said housing means includes an isolation block of low thermal conductivity by which said housing means is attached to said second element thermally isolating said seal assembly from said second element.

* * * * *